United States Patent
Gambhir et al.

(10) Patent No.: US 9,372,740 B2
(45) Date of Patent: Jun. 21, 2016

(54) SYSTEMS AND METHODS FOR SITUATIONAL APPLICATION DEVELOPMENT IN THE ENTERPRISE ENVIRONMENT

(75) Inventors: Kapil Gambhir, New Delhi (IN); Anuj Gupta, New Delhi (IN); Jaspreet Singh, Delhi (IN)

(73) Assignee: International Business Machines Corporation, Armonk, NY (US)

( * ) Notice: Subject to any disclaimer, the term of this patent is extended or adjusted under 35 U.S.C. 154(b) by 796 days.

(21) Appl. No.: 12/639,888

(22) Filed: Dec. 16, 2009

(65) Prior Publication Data

US 2011/0145933 A1    Jun. 16, 2011

(51) Int. Cl.
*G06F 17/30* (2006.01)
*H04N 7/16* (2011.01)
*G06F 9/54* (2006.01)
*H04L 29/06* (2006.01)

(52) U.S. Cl.
CPC .................................. *G06F 9/547* (2013.01)

(58) Field of Classification Search
CPC ................................ G06F 9/547; G06F 21/22
USPC ........ 726/27–30; 709/223–226; 715/708, 764
See application file for complete search history.

(56) References Cited

U.S. PATENT DOCUMENTS

| | | | |
|---|---|---|---|
| 2005/0234917 A1* | 10/2005 | Branham | G06Q 10/107 |
| 2008/0016580 A1* | 1/2008 | Dixit | G06F 21/604 726/27 |
| 2008/0086557 A1* | 4/2008 | Roach | H04L 12/14 709/224 |
| 2008/0319884 A1* | 12/2008 | Yi et al. | 705/34 |
| 2010/0125623 A1* | 5/2010 | Rice | H04L 67/2814 709/202 |

OTHER PUBLICATIONS www.kapowtech.com/products/kapow_ondemand_dat.pdf, Kapow OnDemand.
www.enterprise2conf.com/2007/presentations/conference/st07-gandhi.pdf.
Adams, H., Mashup business scenarios and patterns, Part 1, IBM Jan. 27, 2009, www.ibm.com/developworks/lotus/library/mashups-patterns-pt1.
Adams, H., Mashup business scenarios and patterns, Part 2, IBM Jan. 27, 2009, www.ibm.com/developworks/lotus/library/mashups-patterns-pt2.
http://en.wikipedia.org/wiki/Mashup_(web_application_hybrid).

* cited by examiner

*Primary Examiner* — Evans Desrosiers
(74) *Attorney, Agent, or Firm* — Ference & Associates LLC

(57) ABSTRACT

Embodiments of the invention broadly contemplate a situational application development framework that provides consumable software components that are accessed as services and monitored in a standardized fashion through a mediator service and thus suitable for use in a controlled development environment. At least one embodiment of the invention thus facilitates on the fly application creation using mashup makers in an enterprise setup.

17 Claims, 7 Drawing Sheets

Role and Policy based categorization of services

Controlled Service invocation

Uncontrolled Service invocation

SYSTEMS AND METHODS FOR SITUATIONAL APPLICATION DEVELOPMENT IN THE ENTERPRISE ENVIRONMENT

BACKGROUND

"In web development, a mashup is a web page or application that combines data or functionality from two or more external sources to create a new service." "A mashup application is typically characterized as a lightweight integration of application widget components (for example deployed as an HTML page with associated widgets packaged as WAR files) rendered within a browser." Adams, H., *Mashup business scenarios and patterns: Part 1*, IBM 27 Jan. 2009 (hereinafter "Adams") "The use of mashups to address enterprise needs has progressed in the adoption curve to the point where the growth is becoming exponential . . . More times than not, a solution for one industry can be deployed horizontally to cover other industries with similar needs." Adams. "A situational mashup is created for a unique business need and is often utilized only for short periods of time while the business situation exists." Adams.

Mashups and situational applications are being created on the fly with the end users themselves having the power and flexibility to tap software services and components on demand as the building blocks. Web 2.0 is shifting the fulcrum to the client side with the client capability jumping leaps and bounds. This in turn is unleashing a model in which a lot of component providers are supplying granular, pluggable components and services that can be used in a new application context.

BRIEF SUMMARY

Embodiments of the invention broadly contemplate a situational application development framework facilitating on the fly application creation using mashup makers in an enterprise setup. Embodiments of the invention provide for mediated categorization of consumable software components/products as a service based on user roles and enterprise policies. Embodiments of the invention provide mediated usage and standardized modes of accessing of services, both online and offline, in a situational application development environment suitable for enterprise use.

In summary, one aspect of the invention provides an apparatus comprising: one or more processors; and one or more modules executable by the one or more processors, the one or more modules comprising: a mediator module configured to: receive user session data from a mashup maker; and provide access to the one or more services to the mashup maker in response to a determination that the one or more services are associated with the user session data based on one or more of a policy and a role.

Another aspect of the invention provides an apparatus comprising: one or more processors; and one or more modules executable by the one or more processors, the one or more modules comprising: a mashup maker configured to: provide user session data to a mediator module, the user session data comprising information sufficient to enable the mediator module to associate one or more services with the user session data based on one or more of a policy and a role; and receive the one or more services in response to a determination by the mediator module that the user session data authorizes access to the one or more services.

A further aspect of the invention provides a computer readable storage medium having computer readable program code embodied therewith, the computer readable program code comprising: computer readable program code configured to: cause a mediator module to receive user session data from a mashup maker; and cause the mediator module to provide the one or more services to the mashup maker in response to a determination that the one or more services are associated with the user session data based on one or more of a policy and a role.

A still further aspect of the invention provides a computer readable storage medium having computer readable program code embodied therewith, the computer readable program code comprising: computer readable program code configured to: cause a mashup maker to provide user session data to a mediator module, the user session data comprising information sufficient to enable the mediator module to associate one or more services with the user session data based on one or more of a policy and a role; and cause the mashup maker to receive the one or more services in response to a determination by the mediator module that the user session data authorizes access to the one or more services.

For a better understanding of embodiments of the present invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
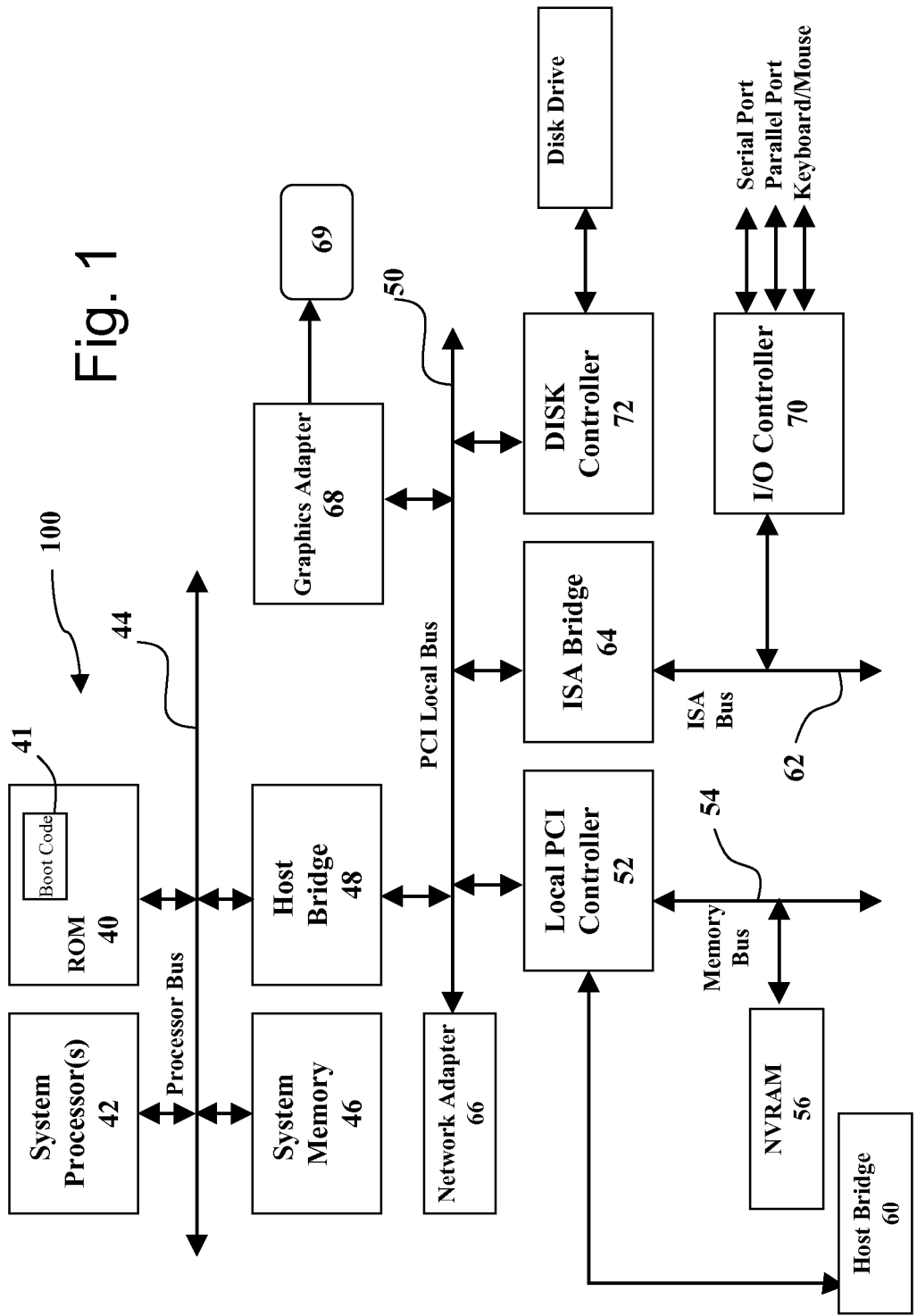
FIG. 1 illustrates non-limiting examples of components of a computer system according to an embodiment of the invention.

It will be readily understood that the components of the embodiments of the invention, as generally described and illustrated in the figures herein, may be arranged and designed in a wide variety of different configurations in addition to the described presently preferred embodiments. Thus, the following more detailed description of the embodiments of the invention, as represented in the figures, is not intended to limit the scope of the claims but is merely representative of selected presently preferred embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the figures/drawings. The following description is intended only by way of example, and simply illustrates certain selected presently preferred embodiments of the invention as claimed herein.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that throughout this disclosure the terms "component(s)" and "service(s)" are used interchangeably, i.e. to refer to software component(s) utilized as service(s). The inventors have recognized that it is proving to be an attractive proposition for enterprises and small and medium businesses (SMB) to utilize software components as services, provided and/or hosted by other providers on the web, that can be consumed in a similar manner and used in situational application development. The inventors have recognized that doing so leads to, among others, the following benefits: business users can create and use applications on the fly in an easy to use browser based development environment (mashup maker); there is no deployment or IT/admin team involvement, hence quick turnaround; and components/services being consumed will be provided by component providers and can be hosted in internal and/or external environments.

However, the inventors have recognized that a business/enterprise environment often imposes constraints and raises issues preventing such implementations. These constraints and issues become all the more pronounced for business-critical applications. Thus, the inventors have recognized that for this model to be enterprise ready, or to be used in a software as a service (SaaS) environment, some aspects need to be plugged in before adoption.

For example, the inventors have recognized that an enterprise needs a regulated and controlled environment, which demands a policy driven mechanism for access to services. These policies need application at various levels such as enterprise, department, personal, etc. With multiple parties involved, various roles are at play in the enterprise scenario. This also means obtaining and maintaining control over which components/services can be accessed by which users (of corresponding roles) is important. Such components/services are preferably transparently communicated across to the user while a back end system monitors the use of services and mediates important parts of transactions, for example charging and auditing. Thus, the inventors have recognized a need for a trusted central monitoring authority (mediator service) to be present to keep a tab on all activities.

According to embodiments of the invention, the central monitoring authority (mediator service) ensures secure single sign on access is available to paid and secure/controlled services. The central monitoring authority (mediator service) acts as a trusted mediator for interactions with controlled third party services. This enables a whole new business model that provides new revenue streams for the parties involved, from component/service providers down to the end users. A set of business users accessing paid services would, for example, create a need for charging, billing and payment mechanisms to be in place. According to an embodiment of the invention, integrated and transparent charging, billing and payment mechanisms are provided.

According to embodiments of the invention, meta data/information about the services are preferably made available to the users so that they can search, sort, pick and choose their desired and suitable services. The meta data/information can include useful data like various quality of service (QoS) parameters, for example reliability and performance metrics, as they assume more importance in an enterprise where critical applications are being created.

The inventors have also recognized that there is a need for a robust feedback mechanism (both user and system feedback) to be in place so that services can be evaluated on a regular basis. Such regular evaluation would create an ecosystem where quality is self-sustained. The inventors have also recognized that keeping track of what is happening and where is often a non-negotiable aspect of governance in the enterprise environment. For example, proper logs and audit trails for all activities need to be in place. These would also come in handy in case of any disputes or issues that may arise. Accordingly, embodiments of the invention provide monitoring services suitable to address the above concerns.

Additionally, the inventors have recognized that there are situations that require services (for example provided by component providers) to go offline, either for processing ease, due to bandwidth constraints, or security concerns. Accordingly, embodiments of the invention facilitate use of components/services, derived from third party vendors, off line, with appropriate and transparent monitoring and billing services.

As a non-limiting example highlighting the need recognized by the inventors for an enterprise ready framework addressing the problems discussed above, the following business use-case is informative. Consider a company that wishes to launch a product for a certain category of customers. Assume that the company needs to select these customers based on, for example, a complex rating algorithm. A business user at the company will conventionally need to check with the IT department, with the usual response being an indication that it will take a significant amount of time (for example on the order of months) to implement. Alternatively, a business user may query the web and find a few providers that offer such a complex rating algorithm as a service, for example on a pay-per-use basis. The business user may select to use a conventional mashup maker to create the required application in 10 minutes and be enabled to execute the application almost immediately.

Assuming the business user does this, however, the inventors have recognized that the following problems, among others, may be encountered. The business user may, when selecting the service be asked to choose between a free version of the service versus a pay-per-use version of the service, not realizing these both provide the same functionality, as there is not a mechanism in place to verify the provider is trustworthy (for example monitor QoS). The business user may run the application only to find that the service provider chosen is down when the business user needs the service. The user may not know how secure the service is with respect to encrypted transmission of (for example confidential) data over the web. Another business user may access the application once it is created, even though he or she is not authorized to do so. The business user may be required to register with the chosen provider, causing the business user to remember another login ID and password set. The business user may be charged more than was originally estimated by the provider for use of the application service, and there is no audit trail to determine for what use the business user actually should be charged. The business user may be quoted a one-second response time, whereas the service may actually take much longer, only to have the provider make an excuse (for example, bandwidth problems). If the application becomes business critical, the business user's IT department may demand that the service work in off-line mode because the Internet is not reliable enough; the provider may or may not provide the service for use in an off-line mode. These are just a sampling of difficulties that the inventors have recognized may be encountered in situational application development for enterprises using conventional means.

Accordingly, at least one embodiment of the present invention provides a situational application framework utilizing categorization and policy based consumable software components as services in a controlled environment. The framework provides businesses with the ability to implement situational applications. The framework preferably includes at least a component gateway and a categorization component at its core. An embodiment of the invention facilitates using mashup makers in an enterprise setup so that all the issues and constraints common therewith, as highlighted above, are suitably addressed for the enterprise environment.

Specifically, the situational application framework preferably securely and reliably provides components/services from a variety of sources. A role and policy driven mechanism is preferably provided for a regulated environment. The framework facilitates ease of selection of services for usage based on classification and categorization. The framework supports an out-of-the-box user authentication and authorization mechanism. The framework supports newer business models and provides revenue streams for the multiple businesses involved. The framework supports provisioning and usage of components/services off-line, supporting security and pricing for off-line components/services. The framework provides auditing capabilities. The framework provides trusted monitoring of controlled and paid services and supports needed flexibility for using private, enterprise and global services. Accordingly, the framework allows for the enterprise management of the billing and payment for accessing the services. To summarize, embodiments of the invention provide a situational application framework to handle all operational complexities transparently, facilitating business user access of public services as easily as enterprise services, all in a controlled situational application development environment.

The description now turns to the figures and certain select and non-limiting presently preferred embodiments of the invention will be described in further detail.

Referring now to FIG. 1, there is depicted a block diagram of an illustrative embodiment of a computer system 100. The illustrative embodiment depicted in FIG. 1 may be an electronic device such as a desktop or workstation computer. As is apparent from the description, however, embodiments of the present invention are applicable to any appropriately configured electronic device, as described herein.

As shown in FIG. 1, computer system 100 includes at least one system processor 42, which is coupled to a Read-Only Memory (ROM) 40 and a system memory 46 by a processor bus 44. System processor 42, which may comprise one of the AMD line of processors produced by AMD Corporation or a processor produced by INTEL Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 100 to LAN, and graphics adapter 68, which interfaces computer system 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 100 and attached peripheral devices such as a as a keyboard, mouse, serial and parallel ports, etc. A disk controller 72 connects a disk drive with PCI local bus 50. The USB Bus and USB Controller (not shown) are part of the Local PCI controller (52).

Figure 2:
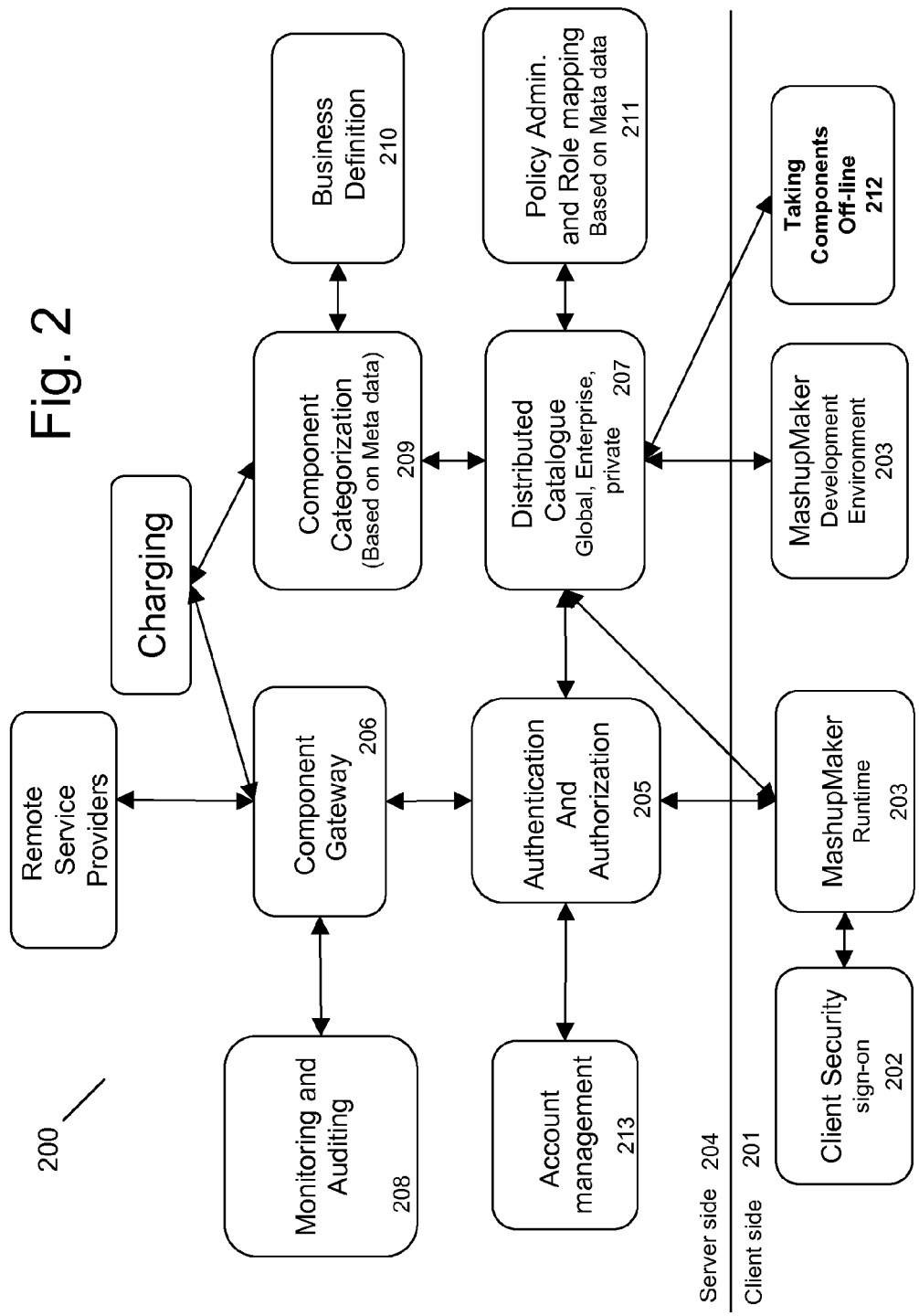
FIG. 2 illustrates a high level view of a framework for situational application development according to one embodiment of the invention.

FIG. 2 illustrates a high level view of an overall framework 200 for situational application development according to one embodiment of the invention. As shown, a client side 201 is distinguished from a back end system (for example server side 204), which is preferably where a client security sign-on 202 service is provided in the context of, for example a client browser environment. The client side 201 is also where the browser implemented mashup maker application 203 is implemented. In order to facilitate the use of the mashup maker application 203 in a controlled business environment, as described herein, supporting functions (for example mediator services) are provided in part by server side 204.

The client side 201 (for example a client device such as computer system 100) is in operable communication with the server side 204. The server side 204 provides, among other things, the mediator services, connecting business clients (on the client side 201) with a myriad of services, including at least local, enterprise and global (for example offered by remote service providers) services listed a distributed catalogue 207 of available components. The business user is preferably first authenticated by an authentication and authorization service 205, giving certain authorizations to particular business users with appropriate credentials.

Once authenticated and authorized, communications from the client side 201 are routed to the component gateway 206, discussed further herein, as a control measure.

The component gateway 206, as described further herein, can either act as a selective filter for services (for example for controlled services) and/or monitor and facilitate storage of usage details (for example for uncontrolled services). The business user is, depending upon proper authorization, enabled to access certain services within the distributed catalogue of services 207. As shown, component gateway 206 can be leveraged to initiate a payment ("charging") mechanism for certain services. A component categorization service 209 is provided, such that services can be appropriately categorized (for example based on policies and roles, as discussed further herein) prior to inclusion in the distributed catalogue 207. For example, business definitions 210 may be associated with the services to facilitate appropriate categorization and selection. Policy administration and role mapping (for example as provided by administrators) can be implemented by policy and role mapping service 211 based on the meta data available regarding the services.

Depending upon the particular business user, selections can be made by the business user (from the mashup maker application 203 (development environment)) from the distributed catalogue 207 for use in situational application development, i.e. mashup making. As discussed further herein, depending upon the type of service, the business user may select services for use in an off-line mode 212. Off line mode is a particularly attractive alternative for business critical applications where increased security is desired, yet pricing and charging mechanisms still need to be implemented (for example for paid services).

As above, an embodiment of the invention facilitates creation of business definitions 210 for mapping the many (for example thousands) of business components/services available on the web. These business components/services need to be mapped to a business process. At least one embodiment of the invention provides standard business process data as a business definition 210. Component providers may map their components to the standard business process as deep as possible. Discovery by a business user can then be conducted through a business process that they understand because of the standardized business definition 210 associated with each component/service. Business users can thus see all the implementations from different providers for a particular business function and can compare QoS, price, etc. using the business definitions 210. A non-limiting example of a business definition 210 is as follows:

Finance→Credit card→Customer rating→High worth individuals rating

An embodiment of the invention facilitates categorization of services by component categorization service 209. Appropriate categorization is quite important, not only for searching and comparing, but also to enforce role based/policy driven access. The following are various important parameters of interest (some of which may be implemented as dynamic parameters) that may be categorized for example by using business process maps (Domain→Sub domain→Business process):

QoS (for example availability and performance);
User Rating;
Off-line Capability (for example Y/N);
Security (for example authentication type, encryption levels);
Pricing (for example subscription based, pay-per-use (transaction, time, byte, etc.) and free services);
Type of Service (for example private, enterprise and global).

An embodiment of the invention provides a repository for services (for example distributed catalogue 207) containing for example the name of the service, a service description, a location (for example a URL) and categorizing parameter values. The distributed catalogue 207 can be logically segregated (for example as global, enterprise or private services). Enterprises and individuals (for example business users, third party vendors offering components/services) can be responsible for administrating their parts of the distributed catalog 207. These functions are preferably made transparent to the user at development time and he or she should see one palette of all services available at development time. This gives an enterprise the flexibility to add components to the distributed catalog 207 and take the ownership of associated managed characteristics (for example security and QoS).

The policy and role mapping service 211 according to an embodiment of the invention provides for managing and controlling services utilized by various business users during development of mashup applications. An embodiment of the invention provides standardized roles that an enterprise can use to map their in-house roles. An enterprise can also define polices for the services available. For example, a policy may be: Rating>5, QoS>99, Already Subscribed, Domain: HR, Sub-Domain: Hiring. Process 0:ABC. One can assign this policy to the roles, so for example the above policy can be assigned to the HR role of a particular enterprise (for example enterprise A), delimiting the components/services accessible to HR business users accordingly.

The client side security service 202 according to one embodiment of the invention preferably provides a secured channel for business users accessing services through the mediator (server side 204). Service invocation is preferably transparently handled by the component gateway 206 with respect to secured access for controlled (for example paid) services. For uncontrolled services, the monitoring is preferably handled by the client side 201 browser and the information is sent to the server side 204 (for example monitoring and auditing service 208) for centralized recording.

The authentication and authorization service 205 preferably authenticates the business user/client based on single sign-on (SSO). Then, based on the applicable role and policy for that business user and enterprise, checks the authorization to use a component/service. Authorizing the use of a paid service can be based on a relevant parameter, for example an applicable credit limit for a user. This is preferably implemented as a dynamic function and need not be checked periodically.

Preferably all controlled (for example paid) service calls will be routed through the component gateway 206. The component gateway 206 is a core piece of the framework which co-ordinates with all other modules/services. The component gateway 206 will preferably authorize, monitor and capture usage data irrespective of the type of service (controlled or uncontrolled). This data will be used for determining access to particular services, QoS monitoring, pricing, providing an audit trail, managing accounts, etc.

The monitoring and auditing service 208 can store relevant information useful in monitoring and controlling the components/services maintained. For example, the availability of the component/service based on error code data and the response time of the components/services can be maintained and monitored. The following audit data can, for example, be maintained: User ID, Time, Component, and Usage Data.

This will facilitate at least selection of appropriate services based on QoS history and prove useful should auditing be necessary.

A key part of the overall ecosystem according to one embodiment of the invention is the ability to define the revenue model so that mediator and service/component providers get paid for what they are providing. In this regard, component gateway 206 will support a pricing module (refer to FIG. 4). The competition thus engendered will result in innovation and less costly components. Thus, according to one embodiment of the invention, the framework will support both a subscription based model and a pay-per-use based model (for example Transaction, Time, bytes used). One embodiment of the invention handles a pre-paid and post-paid model for providing components/services as well as handling payment for taking components off line 212. An embodiment of the invention integrates with third party billing and payment solutions, facilitating the provisioning of services by third party vendors. In this regard, users also preferably have access to account management data service 213, providing necessary information for monitoring and managing accounts (for example billing statements).

According to an embodiment of the invention, at least the following type of accounts would be managed: enterprise, enterprise users, enterprise admin users (catalogue, role, policy makers), service and component providers (developers). An embodiment of the invention thus facilitates recording and management of payment, billing, usage, credit limits, etc via the account management service 213. The account management service 213 thus provides a standardized accounting system for a variety of users having a variety of different needs.

In certain situations, components will need to be housed off line in order to ensure adequate access and security. Thus, an embodiment of the invention provides a repository 212 for housing off line components for use in the mashup maker. For example, the Internet is not reliable in many areas for a variety of different reasons. As such, in some cases services are imperatively required to be hosted within the enterprise. Thus for business critical applications, enterprises will prefer to take some components offline. This means that the whole package will need to be hosted on the enterprise infrastructure (download and deploy). Nonetheless, pricing, etc., still needs to be handled. Accordingly, an embodiment of the invention provides for example a pre-paid billing model suitable for use in taking components off line.

Figure 3:
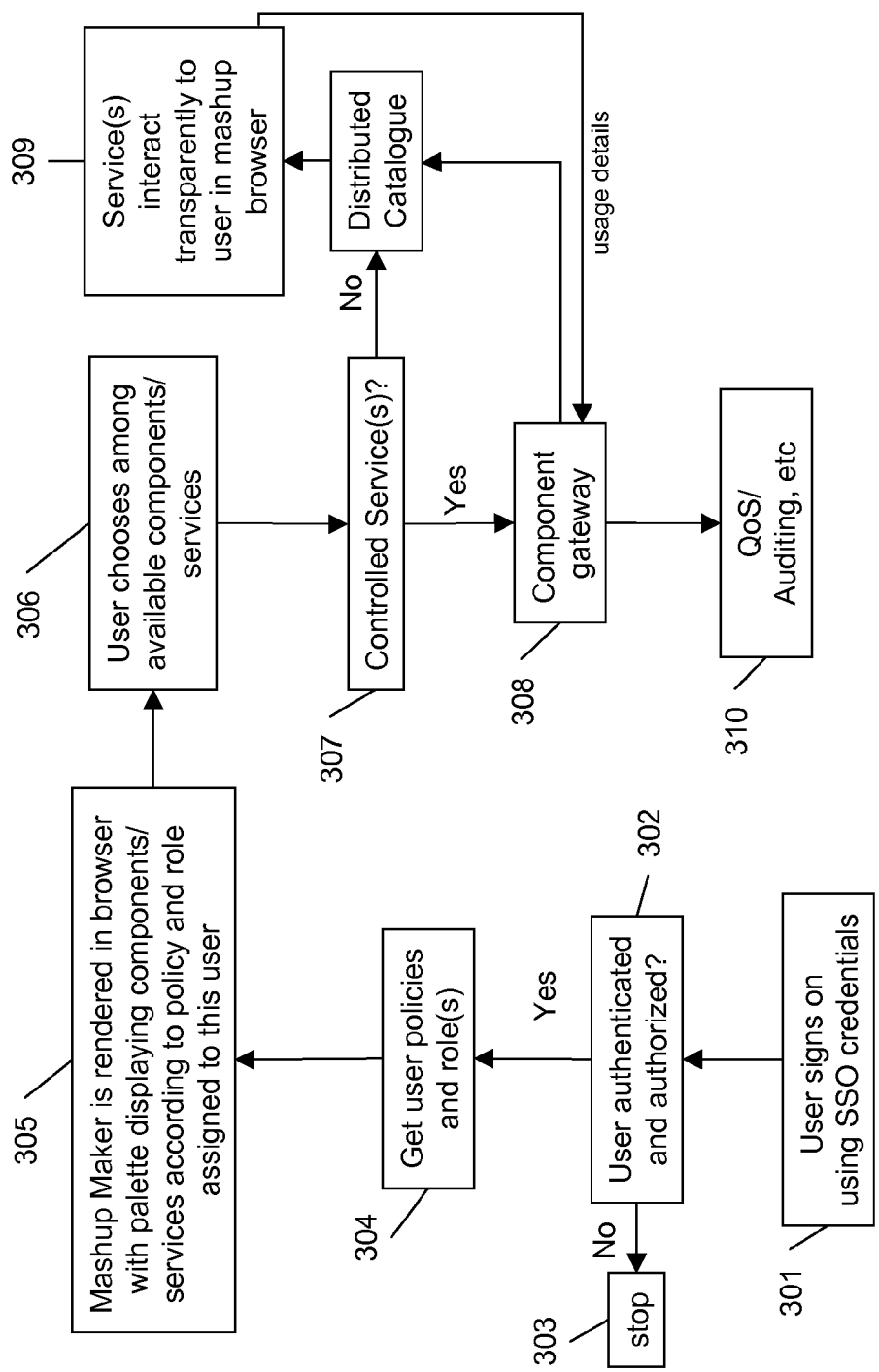
FIG. 3 illustrates a method for situational application development according to one embodiment of the invention.

FIG. 3 illustrates a method of situational application development according to one embodiment of the invention. As shown, a user first signs on 301 using the single sign-on (SSO) service. The user must be authenticated at 302 prior to being given access to components/services. If the user is not authenticated, at 303 the process may stop or the user may be offered limited access.

If the user is authenticated at 302, the user will be authorized to use certain components/services according to the policies and roles assigned to the user. At 304 the enterprise policies and user roles are retrieved. In response, the mashup maker is rendered in the browser of the client machine at 305. The user will have certain components/services available based upon the policies and roles assigned. The user can choose among the components/services at 306 presented in the palette. A determination is made at 307 as to whether the service(s) selected are controlled services. If the one or more of the services is controlled, the component gateway will be invoked to filter the service access at 308 according to the policies/roles and monitor usage (for example monitor time usage for a pay-per-usage service).

If there are no controlled services chosen, the browser itself will handle the components/services. Irrespective of which components/services are chose, at 309 the components services can be mashed up in the mashup maker of the browser to transparently create a situational application suitable to the user. The usage, particularly of controlled components/services, will be monitored and logged for later use at 310. For example, an audit trail can be maintained for usage of a controlled pay-per-use service. Accordingly, the user is able to use the services transparently in the mashup maker to create the situational application with the QoS, charging, and auditing information regarding services utilized automatically and transparently tracked. Moreover, enterprises can be assured only authorized users have access to particular services.

Thus, utilizing an embodiment of the invention, a user signs on to the platform using SSO credentials and a mashup maker is rendered on the browser with the palette displaying services which are in alignment with the policy and the role assigned to the user. The user quickly locates the relevant set of services based on the business process mapping and can then compare and choose a service based on a wide set of criteria (for example pricing, QoS). The user the mashes up the chosen services to create a situational application and executes the application. The service interactions are transparently handled by the component gateway for controlled services and for the rest are directly handled by the browser. The user can access the charging, QoS and audit trails of the services accessed and geta a well-defined billing statement and payment can be handled centrally.

Figure 4:
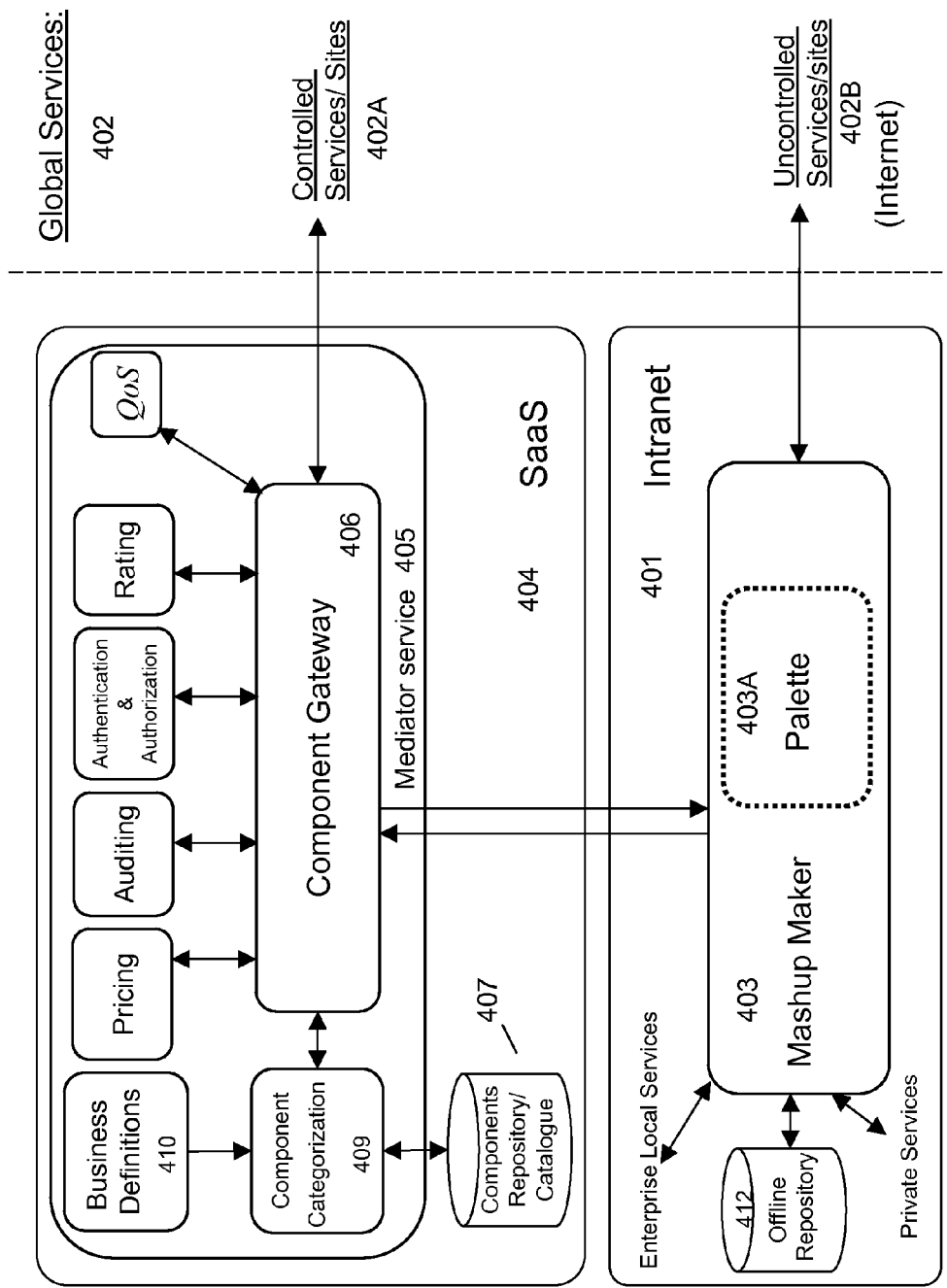
FIG. 4 illustrates a situational application development system according to one embodiment of the invention.

FIG. 4 illustrates a situational application development system according to one embodiment of the invention. As shown the system generally is segmented into a client side 401 and a back end system or server side 404. The client side 401 includes a mashup maker application 403 with a palette 403A for creating the mashups. The mashup maker application 403 has access to local content (for example via intranet connection) such as enterprise local services, private services and services stored in an offline repository 412, as well as global services 402 such as software services offered by third party vendors.

The mashup maker application 403 of the client side 401 can be configured to access uncontrolled services 402B via a suitable connection, for example an Internet connection. These uncontrolled services may include for example free software services offered by remote third parties. Preferably the client side 401 browser is capable of retrieving and rendering these uncontrolled services. Again, usage details regarding the use of uncontrolled services is preferably monitored using component gateway 406, as discussed further herein.

The mashup maker application 403 is in operable communication with the server side 404 via a suitable network connection, the server side having one or more mediator services/modules 405. The client side 401 communicates with the component gateway 406 for access to controlled services, which preferably include pay services offered by third party vendors. Importantly, the component gateway 406 facilitates managing access and control over the mashup maker application 403 activities and recording the same. As shown, the component gateway 406 provides pricing, auditing, authentication and authorization, rating and QoS services. The component gateway 406 is configured to utilize component categorizations 409, produced in part using business definitions 410, to monitor and control access of both components/services stored in a distributed catalogue 407 and controlled services 402A accessed via the Internet according to the policies and roles defined by the enterprise.

In response to proper authentication and authorization, component gateway 406 permits access to various services (for example from catalogue 407 or controlled services 402A from a remote site). These services are delivered back to the mashup maker application 403 on the client side 401 for use in developing a situational application in the palette 403A by a business user.

Figure 5:
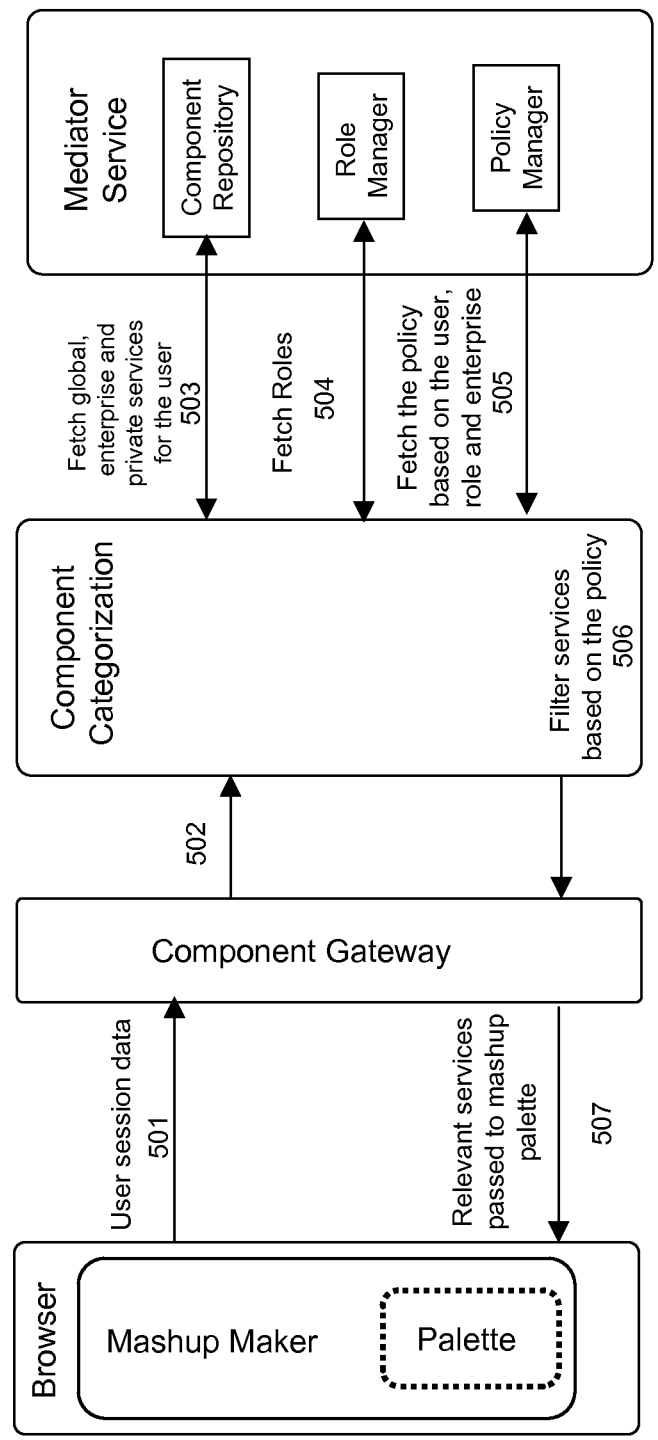
FIG. 5 illustrates a situational application development method for role and policy based categorization of services according to one embodiment of the invention.

FIG. 5 illustrates a situational application development method for role and policy based categorization of services according to one embodiment of the invention. The mashup maker application is provided in a browser environment on the client device. The user passes session data (for example user sign on data, component/service requests) to the component gateway at 501. The component gateway acts as a core facilitator for the system. The component gateway implements roles and policies per the mediator service. The component gateway passes user session data to the component categorization service at 502.

Using the user session data, the component categorization service fetches the service(s) requested (for example enterprise, private and/or global services) from the mediator service at 503. The component categorization service fetches the appropriate role(s) for the user at 504. At 505 the component categorization service also fetches the policy based on the user, role and enterprise. The component categorization service is thus enabled to filter the services based on the policy and roles associated with the user and the service(s) requested at 506. Once properly filtered, the service(s) can be passed to the mashup maker for situational application development via the component gateway at 507. Accordingly, the system will manage access to services that have been categorized based on roles and policies and only pass certain services to authorized users.

Figure 6:
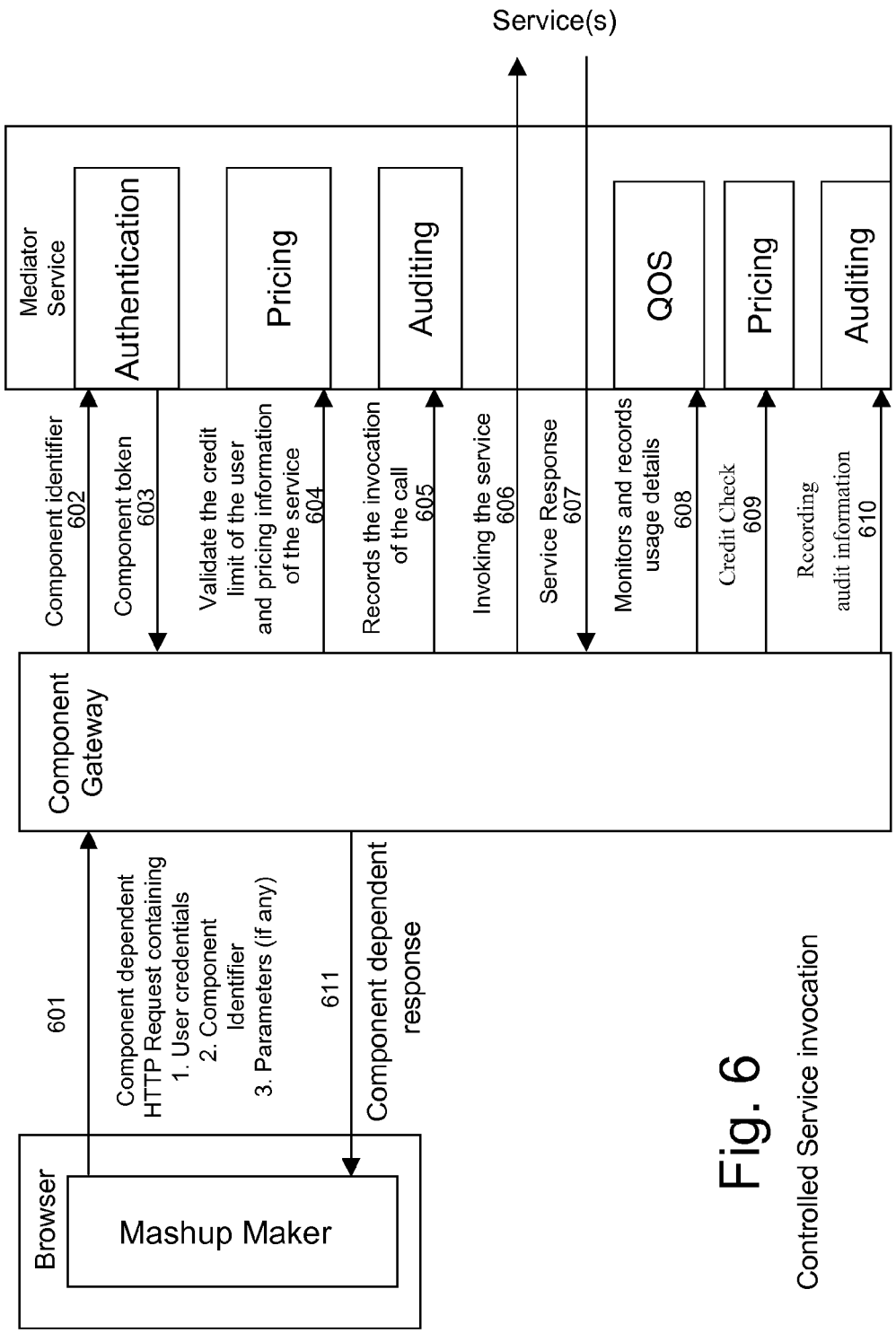
FIG. 6 illustrates a situational application development method for managing controlled services according to one embodiment of the invention.

FIG. 6 illustrates a situational application development method for managing controlled services according to one embodiment of the invention. As discussed herein, enterprises may wish to control access to certain services. Moreover, enterprises may wish to implement a standardized way of managing paid services. Still further, third party vendors (providing services) may wish to have a standardized billing system utilized when granting access to paid services. Business users will additionally appreciate a standardized process for accessing controlled services, as these services will often be provided by providers that require authentication, for example user ID and password.

In FIG. 6, an exemplary process utilized by the system for handling a request for controlled services is illustrated. A user first sends a request for a component/service from his or her browser's mashup maker application to the component gateway at 601. The request can be for example an HTTP request containing user credentials, a component/service identifier, and any relevant parameters. At 602 the component gateway parses this information for authentication of the user and passes the component/service identifier to the mediator service for component/service identification. A (component/service) token is passed back to the component gateway at 603 in response. Assuming for this example that the controlled service is a paid service, the authorized user's credit limit and the price of the component/service requested may be ascertained at 604 in order to ensure the user is capable of accessing the requested component/service. A record of the invocation call is made to the auditing service at 605.

In response to authentication and pricing, the service is invoked at 606. The service response at 607 is sent to the component gateway. The service is sent on to the mashup maker application at 611 for use by the user. During use of the paid service, QoS measurements can be made and stored at 608. Moreover, any additional credit check(s) can be made at 609 and auditing information can be stored at 610 for later use.

Figure 7:
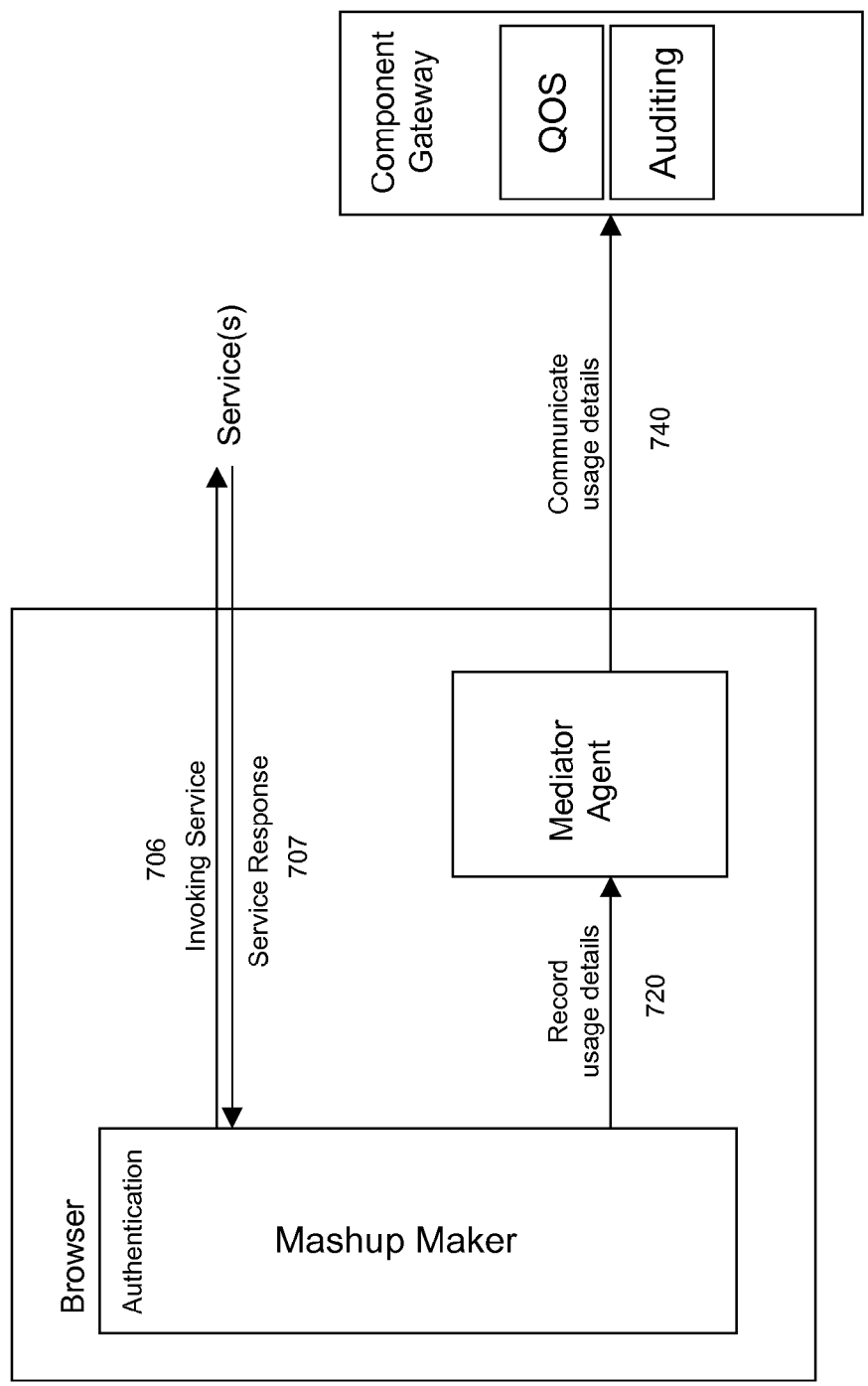
FIG. 7 illustrates a situation application development method for managing uncontrolled services according to one embodiment of the invention.

FIG. 7 illustrates a situation application development method for managing uncontrolled services according to one embodiment of the invention. The user is again able to invoke services using the mashup maker application provided in the browser. However, unlike controlled services, uncontrolled services can be subject to reduced management and control, yet still be monitored. For example, at 706 a user may invoke an uncontrolled service. The uncontrolled service may be for example a software component/service freely available on the Internet. The service response 707 is received directly by the mashup maker application running in the browser environment. Importantly, a record of usage details (user accessing which service, for how long, etc.) is kept and at 720 and sent by a mediator agent at 740 to the component gateway. The component gateway can store the usage details, including QoS metrics and auditing information. Thus, even though these services are uncontrolled, they are monitored and relevant information (for example QoS) is kept for later review.

In brief recapitulation, at least one presently preferred embodiment of the invention provides a situational application framework for categorization of consumable software components in a controlled environment suitable for business use. At least one embodiment of the invention facilitates on the fly application creation using mashup makers in an enterprise setup such that all the issues and constraints common therewith are suitably addressed. Embodiments of the invention provide for, among others, the following advantages: leveraging of SaaS with a mediator service providing/hosting the framework to enable multiple parties (from component/service providers to end users) involved to utilize the ecosystem; categorization of components/services based on a myriad of attributes (fine and course grained); policy based mechanisms for regulating in the enterprise environment; linkage of components/services to business definitions in enterprise(s) for better classification and access control; offline capabilities; QoS monitoring (on multiple levels such as performance, availability, throughput, etc.) and sharing the same with the overall community for better community decision making; and pricing/charging mechanisms (which may be influenced by QoS) and revenue sharing models for the multiple parties involved.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "service," "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. An apparatus comprising:
one or more processors coupled to a memory device; and
one or more modules executable by the one or more processors, the one or more modules comprising:
a mediator module configured to:
receive user session data from a mashup maker;
provide access to one or more services to the mashup maker in response to a determination that the one or more services are associated with the user session data based on one or more of a policy and a role, wherein the one or more services comprise one or more controlled services registered with the mediator module by one or more remote service providers, and wherein the controlled services are operating in a secure environment and are financial services; and
provide access to the one or more services during development of a mashup application; and
a component gateway configured to:
provide one or more of policy based categorization of one or more controlled services and role based categorization of one or more controlled services; and
filter the one or more controlled services based on one or more of the policy based categorization and the role based categorization.

2. The apparatus according to claim 1, wherein the mediator module is further configured to record usage details associated with the mashup maker using one or more uncontrolled services.

3. The apparatus according to claim 1, wherein the one or more modules further comprise a component gateway module configured to receive from the mashup maker usage details associated with use of the one or more of services, the usage details comprising information enabling the component gateway module to provide one or more of automatic pricing, auditing, rating and quality of service monitoring associated with the use of the one or more services.

4. An apparatus comprising:
one or more processors coupled to a memory device; and
one or more modules executable by the one or more processors, the one or more modules comprising:
a mashup maker configured to:

provide user session data to a mediator module, the user session data comprising information sufficient to enable the mediator module to associate one or more services with the user session data based on one or more of a policy and a role, wherein the one or more services comprise one or more controlled services registered with the mediator module by one or more remote service providers, and wherein the controlled services are operating in a secure environment and are financial services;

receive the one or more services in response to a determination by the mediator module that the user session data authorizes access to the one or more services during development of a mashup application;

provide a component gateway module one or more of a policy based categorization of one or more controlled services and role based categorization of one or more controlled services; and filter by the component gateway module the one or more controlled services based on one or more of the policy based categorization and the role based categorization.

5. The apparatus according to claim 4, wherein the mashup maker is further configured to send usage details associated with using one or more uncontrolled services to the mediator module.

6. The apparatus according to claim 4, wherein the mashup maker is further configured to send to the mediator module usage details associated with use of the one or more of services, the usage details comprising information enabling one or more of automatic pricing, auditing, rating and quality of service monitoring associated with the use of the one or more services.

7. The apparatus according to claim 4, wherein the one or more controlled services are filtered by the mediator module based on one or more of policy based categorization of the one or more controlled services and role based categorization of the one or more controlled services.

8. The apparatus according to claim 4, wherein the mashup maker is further configured to access one or more off line services.

9. A non-transitory computer readable storage medium having computer readable program code embodied therewith, the computer readable program code comprising:

computer readable program code configured to:
cause a mediator module to receive user session data from a mashup maker; and
cause the mediator module to provide one or more services to the mashup maker in response to a determination that the one or more services are associated with the user session data based on one or more of a policy and a role, wherein the one or more services comprise one or more controlled services registered with the mediator module by one or more remote service providers, and wherein the controlled services are operating in a secure environment and are financial services;
cause the mediator module to provide access to the one or more services during development of a mashup application;
cause a component gateway module to provide one or more of policy based categorization of one or more controlled services and role based categorization of one or more controlled services; and
cause the component gateway module to filter the one or more controlled services based on one or more of the policy based categorization and the role based categorization.

10. The computer readable storage medium according to claim 9, wherein the computer readable program code is further configured to cause a component gateway module to record usage details associated with the mashup maker using one or more uncontrolled services.

11. The computer readable storage medium according to claim 10, wherein the computer readable program code is further configured to cause the component gateway module to receive from the mashup maker usage details associated with use of the one or more services, the usage details comprising information enabling
the component gateway module to provide one or more of automatic pricing, auditing, rating and quality of service monitoring associated with the use of the one or more services.

12. The computer readable storage medium according to claim 9, wherein the computer readable program code is further configured to cause the mediator module to provide the one or more services for off line use.

13. A non-transitory computer readable storage medium having computer readable program code embodied therewith, the computer readable program code comprising:

computer readable program code configured to:
cause a mashup maker to provide user session data to a mediator module, the user session data comprising information sufficient to enable the mediator module to associate one or more services with the user session data based on one or more of a policy and a role, wherein the one or more services comprise one or more controlled services registered with the mediator module by one or more remote service providers, and wherein the controlled services are operating in a secure environment and are financial services;
cause a mashup maker to receive the one or more services in response to a determination by the mediator module that the user session data authorizes access to the one or more services based on one or more of a policy and a role, wherein the access to the one or more services occurs during development of a mashup application;
cause a component gateway module to provide one or more of policy based categorization of one or more controlled services and role based categorization of one or more controlled services; and
cause the component gateway module to filter the one or more controlled services based on one or more of the policy based categorization and the role based categorization.

14. The computer readable storage medium according to claim 13, wherein the computer readable code is further configured to cause the mashup maker to send usage details associated with using one or more uncontrolled services to the mediator module.

15. The computer readable storage medium according to claim 13, wherein the computer readable program code is further configured to cause the mashup maker to send to the mediator module usage details associated with use of the one or more services, the usage details comprising information enabling one or more of automatic pricing, auditing, rating and quality of service monitoring associated with the use of the one or more services.

16. The computer readable storage medium according to claim 13, wherein the one or more controlled services are filtered by the mediator module based on one or more of policy based categorization of the one or more controlled services and role based categorization of the one or more controlled services.

17. The computer readable storage medium according to claim 9, wherein the computer readable program code is further configured to cause the mashup maker to access one or more offline services.

\* \* \* \* \*